E. MATTHEWS.
VEHICLE SPRING.
APPLICATION FILED MAR. 2, 1917.

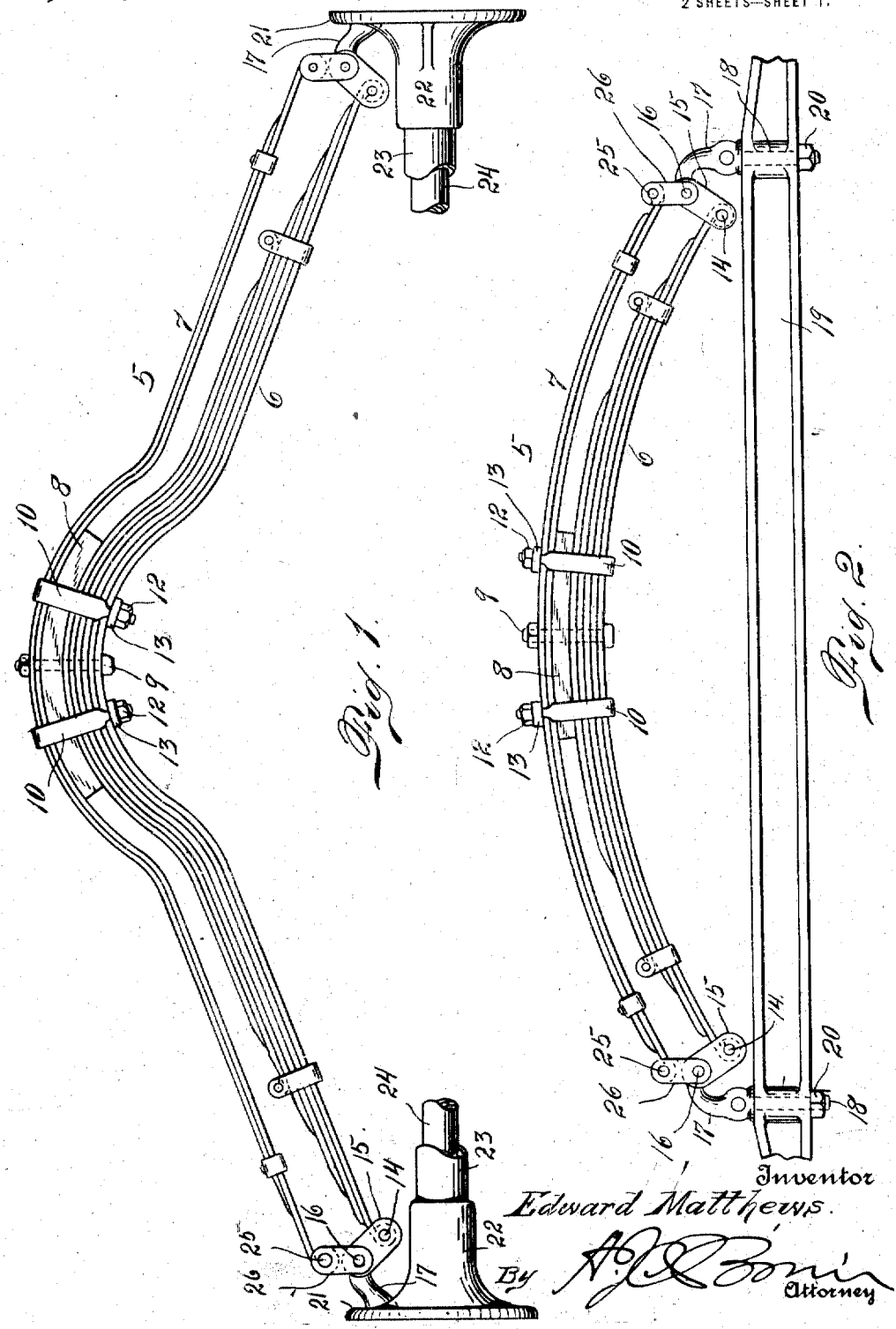

1,281,187.

Patented Oct. 8, 1918.
2 SHEETS—SHEET 2.

Inventor
Edward Matthews.
By
Attorney

UNITED STATES PATENT OFFICE.

EDWARD MATTHEWS, OF DENVER, COLORADO, ASSIGNOR OF ONE-HALF TO LEWIS E. LEMEN, OF DENVER, COLORADO.

VEHICLE-SPRING.

1,281,187.  Specification of Letters Patent.  Patented Oct. 8, 1918.

Application filed March 2, 1917. Serial No. 152,109.

*To all whom it may concern:*

Be it known that I, EDWARD MATTHEWS, a citizen of the United States, residing at the city and county of Denver and State of Colorado, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in vehicle springs more especially adapted for use with automobiles and particularly well adapted for use on Ford machines.

Heretofore, one of the difficulties with other springs, is a tendency to rebound after the downward movement incident to the normal action of the load when the springs are placed under stress, as in going over an uneven surface. In this event, after the central portion of the spring is moved downwardly to its limit of movement under the weight of the load, the tendency is for it to move upwardly and pass beyond the normal position; this upward movement beyond normal being referred to in this specification as the rebound movement or action of the spring. Where this rebound exists to any considerable extent, the occupants of the vehicle are subjected to a sort of shaking up, making the vehicle very uneasy to ride in. Hence the object of my improvement is, to produce a spring which while possessing the necessary resilience or yielding quality under the stress of the load, at the same time practically prevents rebound or the movement of the spring higher than normal, during the upward movement. With this end in view, I construct my spring of upper and lower members which are spaced at the center by a block of non-vibrating material as wood, fiber, etc. The extremities of these two spring members are independently connected whereby the two members are spaced throughout their length. The lower member of the spring which is preferably relatively heavy, has its extremities connected with shackles which stands at a considerable angle to the vertical, allowing the spring to move freely downwardly; while the extremities of the upper member of the spring are respectively connected with shackles which are normally vertically positioned. The shackles with which the extremities of the upper spring member are connected are pivoted at their lower extremities upon the pins which also hingedly connect the shackles of the lower spring member with the bracket or support for the spring, which in the case of the front spring is secured to the axle of the vehicle, while in the case of the rear spring this support is mounted on the inner closure of the brake drum.

By virtue of this construction and arrangement, when the spring moves downward under the stress of the load, the extremities of the lower member move freely downwardly by virtue of the normal position of the shackles which being inclined inwardly and downwardly from the vertical, turn freely on their hinge pins, while the shackles with which the extremities of the upper spring member are connected, have very little movement. In other words, these upper shackles practically maintain their vertical position, with the result that the movement of the upper member of the spring is practically entirely between its extremities. Hence during the upward movement of the spring, it is practically impossible for the upper member to move above its normal position, and by virtue of this feature the rebound of the spring is practically prevented.

Having briefly outlined my improvement, I will proceed to describe the same in detail, reference being made to the accompanying drawing in which is illustrated an embodiment thereof. In this drawing:—

Figure 1 is an elevation of a rear spring of my improved construction.

Fig. 2 is a similar view of the front spring.

The same reference characters indicate the same parts in all the views.

Figure 3:
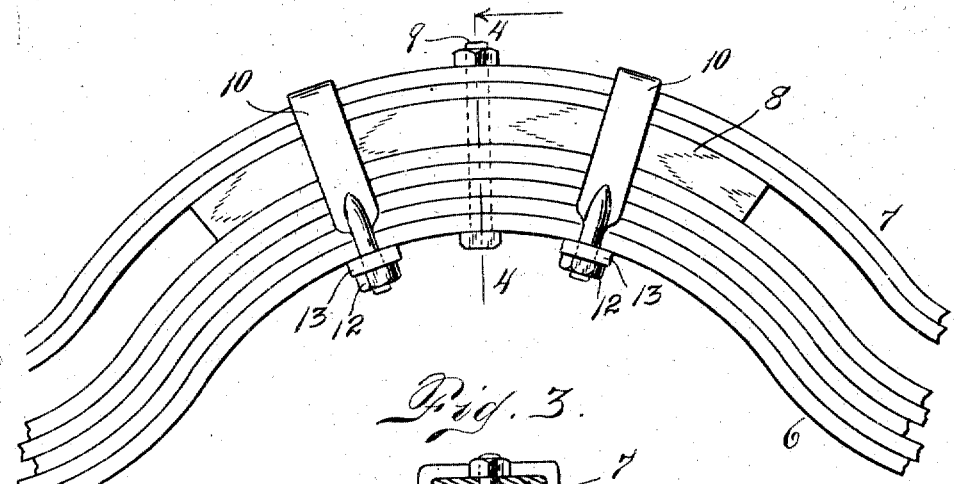
Fig. 3 is a fragmentary view showing the central part of the rear spring on a larger scale.
Figure 4:
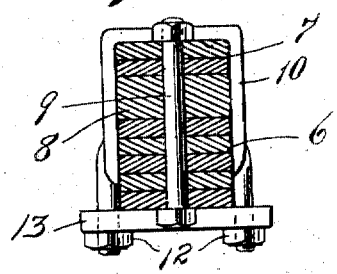
Fig. 4 is a cross section taken on the line 4—4 Fig. 3.

Let the numeral 5 designate the spring considered in its entirety. Each of these springs is composed of a relatively heavy lower member 6 and an upper member 7. As shown in the drawing, the upper member of each spring is composed of two leaves, while the lower member of the rear spring is composed of six leaves, while the corresponding member of the front spring has five leaves. The particular number of leaves shown in each spring member, indicates in a general way the relative strength of the two members, but it must be understood that the invention is not limited to any particular number of leaves for either spring member.

The central portion of each spring is provided with a block of wood 8 or similar material located between the two members 6 and 7; as shown in the drawing the two members are connected with the block 8 by means of a central bolt 9 and by U-clips 10. In the case of the rear spring, the U-clips are held in place by nuts 12 applied to the lower extremities of the two arms of each clip, the said arms being connected by a cross piece 13 in the usual way. In the case of the front spring, the nuts 12 are applied to the upper extremities of the clips.

By virtue of the employment of the block 8 between the two spring members, the latter are normally spaced throughout their length. Each extremity of the lower spring member is pivotally connected as shown at 14 with the lower extremity of a shackle 15 whose upper extremity is hingedly connected with a pin 16, the latter being supported in a bracket 17 whose lower extremity in the case of the front spring includes a bolt 18 which passes through an opening in the axle 19, being secured in place by a nut 20 applied to the lower threaded end of the bolt, the nut being screwed against the axle from below. In the case of the rear spring, each supporting bracket 17 is shown connected with the inner closure plate 21 of the brake drum which is mounted on the hub 22 of the casing 23 in which the rear axle shaft 24 is rotatably mounted.

Figures 5, 6:
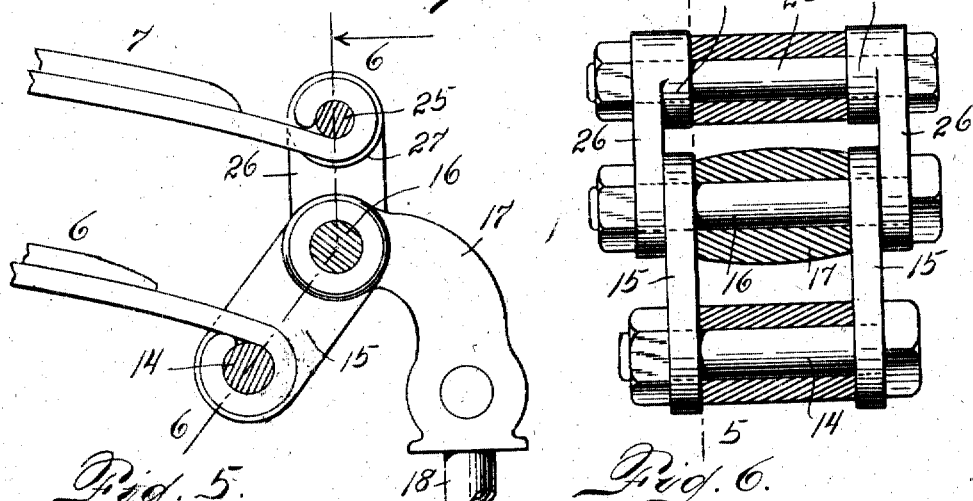
Fig. 5 is a fragmentary view of the front spring, showing one of its extremities and the bracket or support with which the shackles of the two spring members are hingedly connected. This is a section taken on the line 5—5 Fig. 6 and is shown on a larger scale than Fig. 2.
Fig. 6 is a section taken on the line 6—6 Fig. 5.

In the case of each of the front and rear springs, the extremities of the spring member 7 are pivotally connected with pins 25 which are supported in the upper extremities of shackles 26, the lower extremities of these shackles being hingedly connected with the pins 16. In order that the upper shackles 26 which as shown in the drawing are located beyond or outside of the upper extremities of the lower shackle members, may fill the space between the extremities of the pins or bolts 25 and the adjacent ends of the spring member 7, the upper extremities of the arms of the shackle 26 are reinforced as shown at 27. This feature is best illustrated in Fig. 6 of the drawing. Attention is called to the fact that the lower shackles 15 stand at a considerable angle to the vertical and project inwardly toward each other as they extend downwardly from the hinge pin 16. On the other hand, the shackles 26 are normally vertically positioned. During the downward movement of the portion of the spring between its extremities under the stress of the load, the extremities of the lower spring member move freely, as their shackles 15 swing readily downwardly and outwardly due to the tendency of the extremities of the heavy lower spring to move outwardly under load stress. But the upper spring member 7 is weaker, being of such strength that it will curve under load stress and the curvature thereof will compensate for the tendency of the extremities of the spring to move outwardly. As a result the upper shackles 26 practically maintain their vertical position, having very little if any movement. By reason of this fact, as the spring moves downwardly under the stress of the load, the outer portions of the two members, gradually separate since the extremities of the lower member have a very pronounced movement. Again, during the upward movement of the spring, the extremities of the lower member have a pronounced reverse movement toward the extremities of the upper member, while the extremities of the last named member have virtually no movement as heretofore explained. Hence during the upward movement of the spring from its low position under the stress of the load, the upper spring member 7 resists the rebound or upward movement of the spring beyond its normal position.

Having thus described my invention, what I claim is:

1. A vehicle spring comprising upper and lower spaced springs, vertically disposed shackles with which the extremities of the upper spring are respectively connected and similar shackles inclined to the vertical, with which the extremities of the lower spring are connected, the strength of the upper spring being such that said upper spring will curve under load stress and the curvature thereof will compensate for any tendency of its extremities to move outwardly.

2. A spring of the class described comprising upper and lower spaced springs, vertically disposed pivoted shackles with which the extremities of the upper spring are respectively connected, and similar shackles inclined to the vertical with which the extremities of the other spring are connected, the strength of the upper spring being such that said upper spring will curve under load stress and the curvature thereof will compensate for any tendency of its extremities to move outwardly.

3. A spring of the class described comprising upper and lower springs, a centrally located block spacing the two springs, means for connecting the central portions of the two spring members with the block and with each other, vertically disposed means for supporting the extremities of the upper spring, and independent means for supporting the extremities of the lower spring, the means for supporting the extremities of the upper spring being vertically disposed and the means for supporting the extremities of the lower member being of such character as to permit swinging lateral movement, the strength of the upper spring being such that said upper spring will curve under load stress and the curvature thereof will compensate for any tendency of its extremities to move outwardly.

4. A vehicle spring comprising upper and lower spaced springs, the lower member being relatively heavy, a centrally located block spacing the two members, means for connecting the central portions of the two members with the block and with each other, and two pairs of shackles, one pair being located at each extremity of the spring and the individual shackles of each pair being respectively connected with the adjacent extremities of the two springs, the two shackles of each pair being pivotally connected with each other and with a suitable support, the upper shackle of each pair being normally approximately vertically disposed, while the other shackle is inclined to the vertical, the upper spring thus being longer than the lower spring, and being weaker than the lower spring whereby it will curve under load stress and compensate for the tendency of the ends to move outwardly, the vertical shackles thereby remaining substantially vertical.

5. A vehicle spring comprising upper and lower springs, the upper spring being weaker than the lower spring, vertically disposed shackles to which the extremities of the upper spring are directly connected, and shackles inclined to the vertical with which the extremities of the lower spring are connected, the strength of the upper spring being such that said upper spring will curve under load stress.

6. A vehicle spring comprising upper and lower springs, means for connecting the central portions of said springs, the upper spring being longer than the lower spring and weaker, vertically disposed pivoted shackles with which the extremities of the upper spring are connected, and pivoted shackles inclined to the vertical with which the extremities of the lower spring are connected, the strength of the upper spring being such that said upper spring will curve under load stress and the curvature will compensate for the tendency of its extremities to move outwardly, the vertical shackles thus remaining in substantially vertical position.

In testimony whereof I affix my signature, in presence of two witnesses.

EDWARD MATTHEWS.

Witnesses:
  MARY HIGGINS,
  A. EBERT O'BRIEN.